(12) United States Patent
Lau

(10) Patent No.: US 7,648,341 B2
(45) Date of Patent: Jan. 19, 2010

(54) PROCESS FOR RESTORING A TURBINE BLADE

(75) Inventor: Matthew Charles Lau, Deer Park, TX (US)

(73) Assignee: Sulzer Hickham Industries, Inc., LaPorte, TX (US)

( * ) Notice: Subject to any disclaimer, the term of this patent is extended or adjusted under 35 U.S.C. 154(b) by 258 days.

(21) Appl. No.: 11/318,237

(22) Filed: Dec. 23, 2005

(65) Prior Publication Data

US 2007/0148005 A1     Jun. 28, 2007

(51) Int. Cl.
*F04D 29/70* (2006.01)

(52) U.S. Cl. ............... 416/241 R; 415/200; 416/229 R; 29/402.08; 29/889.1

(58) Field of Classification Search ............... 415/115, 415/200; 416/229 A, 241 R, 96 R; 29/412.12, 29/402.08, 889.1
See application file for complete search history.

(56) References Cited

U.S. PATENT DOCUMENTS

| | | | | |
|---|---|---|---|---|
| 3,650,635 A | * | 3/1972 | Wachtell et al. | 415/115 |
| 4,832,252 A | * | 5/1989 | Fraser | 228/119 |
| 5,269,057 A | * | 12/1993 | Mendham | 29/889.1 |
| 5,895,205 A | * | 4/1999 | Werner et al. | 415/210.1 |
| 6,575,702 B2 | * | 6/2003 | Jackson et al. | 416/96 R |

* cited by examiner

*Primary Examiner*—Igor Kershteyn
(74) *Attorney, Agent, or Firm*—Francis C. Hand; Carella, Byrne, Bain et al

(57) ABSTRACT

The restoring process machines out a crack in the platform of a turbine blade to form a pocket that then receives a plug of compatible material. The plug is brazed in place and the blade is the machined and cleaned to present a clean fresh surface where the plug is inserted. The plug has a lower coefficient of thermal expansion so that the plug area has less compressive stresses in the repaired area.

19 Claims, 4 Drawing Sheets

PROCESS FOR RESTORING A TURBINE BLADE

This invention relates to a process for restoring a turbine blade. More particularly, this invention relates to a process for restoring a turbine blade having a crack in the platform of the blade.

As is known, various types of turbine blades, sometimes called turbine buckets, develop cracks when in use. In some cases, the cracks appear along the tips and/or the sides of the blade vane. Many types of repair processes have been developed for restoring these blades for a useful life.

However, blades sometimes have cracks that develop in the platform of the blade. To date, there have been no reliable or economical repair procedures for repairing those cracks and restoring the turbine blades to an operating condition. For example, some repair providers have tried to weld with various weld fillers but these fillers show micro-cracking when examined under a microscope. As a result, these turbine blades are considered to be scrap.

Accordingly, it is an object of the invention to provide a repair process for repairing the cracks in the platform of a turbine blade.

It another object of the invention to provide a repair process that employs a relatively simple technique for restoring the integrity of a cracked platform of a turbine blade.

It is another object to the invention to be able to restore turbine blades having cracks in a platform to a functional use rather than leave the turbine blades as scrap.

It is another object of the invention to restore a turbine blade from a scrap condition to an operating condition.

Briefly, the invention provides a process for restoring a turbine blade having a crack in a platform thereof. In this respect, the process is particularly directed to turbine blades having a blade root (or fir tree) for mounting in a rotor or the like of a turbine engine, a platform adjacent the root and a vane that extends from the platform.

In accordance with the process, after preparing the cracked turbine blade for repair, a pocket is formed in the platform in order to obliterate the crack therein. Next, a plug is inserted into the pocket to completely fill the pocket. In this step of the process, a brazing material, preferably a nickel braze, is applied to the pocket prior to the insertion of the plug. The nickel braze may also be applied to the surfaces of the plug that contact the platform of the turbine blade. Thereafter, the turbine blade and plug are subjected to a vacuum brazing heat treatment in order to braze the plug into the pocket.

After the heat treatment step, the plug and braze material are worked by conventional procedures, such as by machining or blending the plug and braze material to match the surfaces of the turbine blade. In addition, the blade may be cleaned, such as by grit cleaning, after the plug and braze material have been blended to match the surfaces of the turbine blade. Finally, the turbine blade may be subjected to an inspection process of conventional type. For example, use may be made of a Non-Destructive Evaluation (NDE) process that is used to look for cracks, porosity, gaps, voids, inclusions or any other abnormalities.

The plug that is used in the repair process is made of a nickel-chromium-tungsten-molybdenum alloy (Ni—Cr—WMo). For example, a HAYNES® 230®, a nickel-chromium-tungsten-molybdenum alloy that combines high-temperature strength and resistance to oxidizing environments up to 2100° F. obtainable from Haynes International, Inc. of Houston, Tex. The plug may also be made of other suitable materials, such as a cast GTD-111 material (a nickel alloy) having a chemistry very close to INCONEL-738LC. However, the HANES® 230® alloy has improved oxidation resistance as compared with these other alloys.

The machined pocket and the plug have matching shapes so that plug cannot liberate through the top of the platform via centrifugal forces when the blade is in use. For example, the plug is a one-piece item with two overlying sections to define a T-shaped cross-section. In this respect, the plug has a first section that has a rectangular portion from which a semi-circular portion extends at one end and a like second section that is of smaller size than the first section and overlies the first section with the two semi-circular portions presenting a smooth rounded apex at the distal end of the plug. The rounding of the apex is so that the stresses are kept to a minimum. The flat surface of the T-shaped cross section of the plug also gives an advantage (vs. a wedge shaped or triangular shaped croos-section) for braze application.

The pocket is machined into the platform to match the shape of the plug with the degree of machining being sufficient to obliterate the crack and a small area to either side of the crack.

The gap distance between the plug and the pocket is important for the braze application; too wide and the braze will not fill the gap, too tight and the braze will not flow into the gap and join the plug to the parent material.

The repair process may be applied to any type of turbine blade or bucket having a crack in the platform of the blade.

These and other objects and advantages of the invention will become more apparent from the following detailed description taken in conjunction with the accompanying drawings wherein.

Figure 1:
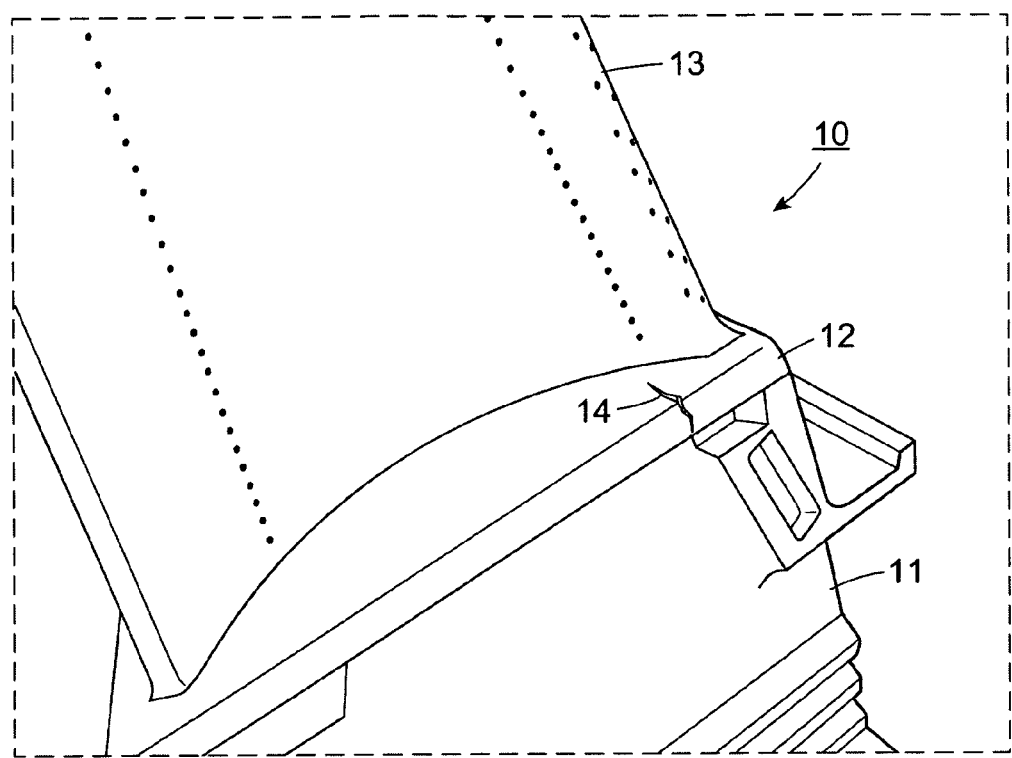
FIG. 1 illustrates a perspective view of a turbine blade having a crack in the platform.

Referring to FIG. 1, the turbine blade 10, for example, a W501FD Row 1 turbine blade having blade root 11, a platform 12 and a vane 13 of conventional structure is presented a crack 14 in the platform 12. In the present case, the crack 14 is located to the concave side of the vane 13 and extends into the platform 12 as well as across the surface of the platform 12.

As indicated, the vane 13 extends along a longitudinal axis from the platform 12 and the platform 12 extends perpendicularly of the vane 13.

Figure 2:
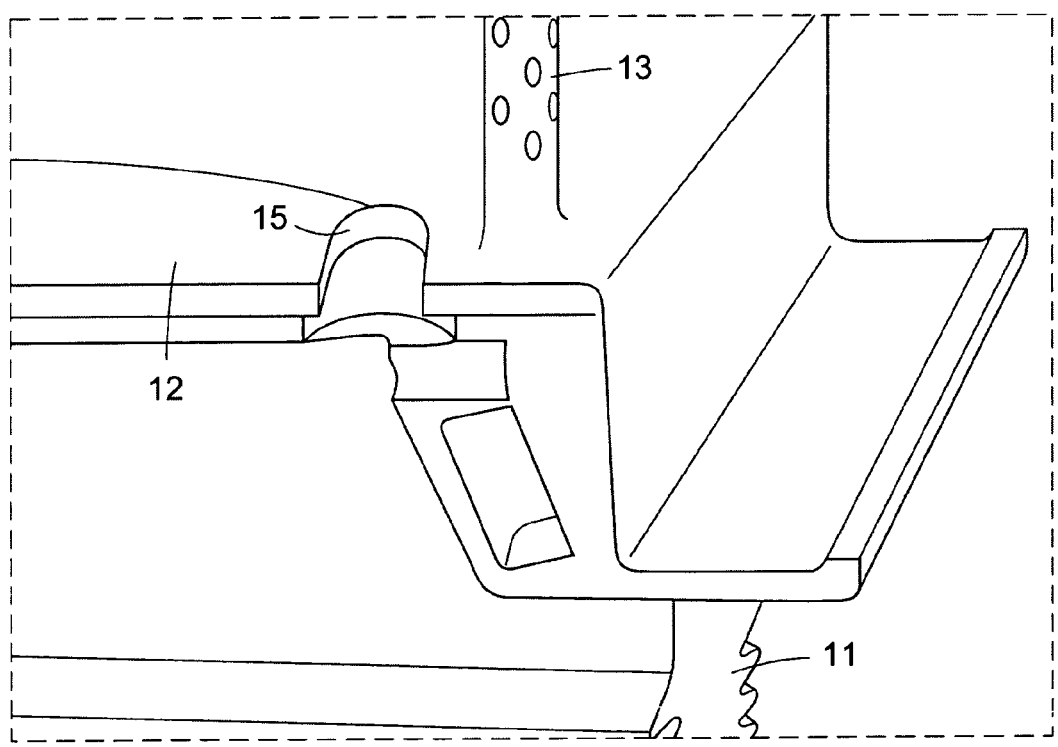
FIG. 2 illustrates the blade of FIG. 1 with a pocket formed in the platform to obliterate the crack in accordance with the invention.

Referring to FIG. 2, in accordance with the process of restoring the turbine blade 10, a pocket 15 is formed in the platform 12 in order to obliterate the crack 14. The pocket 15 may be formed by any suitable machine process, for example, using a "Sinker" Electrical Discharge Machining (EDM) process. This is a machining process that uses electrode shapes to transfer desired geometry into metals via electrical discharge and metal displacement. The blade is set in a tank of dielectric fluid; the blade has a positive charge. The electrode shape has a negative charge and the dielectric fluid acts as a resistor until enough voltage is applied. Then, the fluid ionizes and sparks occur between the electrode and the blade. Sparks precisely melt and vaporize the unwanted material.

Figure 3:
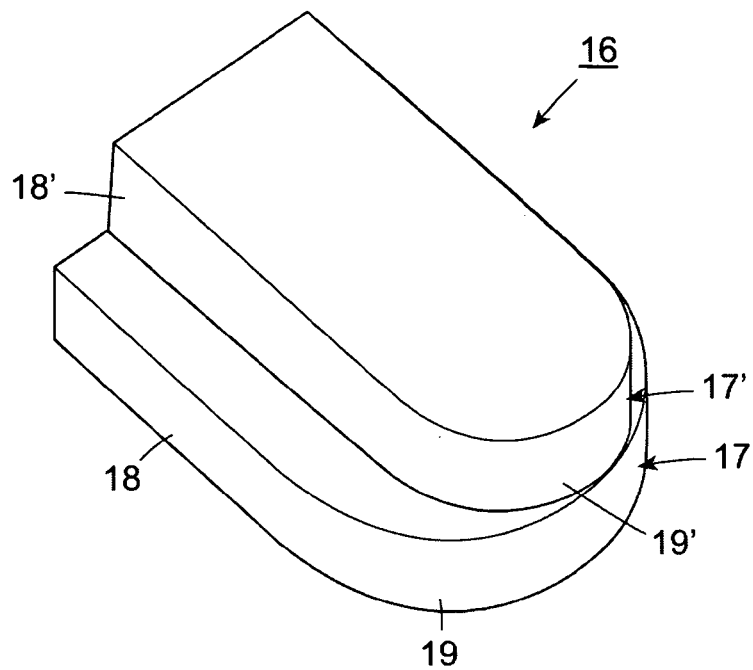
FIG. 3 illustrates a perspective view of a plug in accordance with the invention for insertion in the pocket.

Referring to FIG. 3, the restoration process employs a plug 16 that is to be fitted into the pocket 15 in order to completely fill the pocket 15. As illustrated, the plug 16 is made in one piece and has two sections 17,17'. The larger section 17, illustrated as the lower section, has a rectangular portion 18 and a semi-circular portion 19 extending therefrom. The smaller section 17', illustrated as the upper section, has a similar rectangular portion 18' and a semi-circular portion 19' extending therefrom. The smaller section 17' is disposed in overlying relation to the larger first section 17' with the two semi-circular portions 19,19' having a rounded apex disposed in co-planar relation to present a smooth surface at the distal end of the plug 16. The thickness of the plug sections do not have to be equal but is preferred so that any difference can be split between the middle of the platform thickness.

The plug 16 is made of a HAYNES® 230®, a nickel-chromium-tungsten-molybdenum alloy having a composition of 57.69% Ni, 22% Cr, 2% Mo, 0.10% C, 0.30% Al, 3.00% Fe, 0.50% Mn, 0.40% Si, 0.005% B, 14.00% W. (There is no cobalt present in H230). However, other alloys may also be suitable such as, Nimonic 263 (a nickel cobalt material) or another material.

The pocket 15 that is machined in the platform 12 of the turbine blade is of the same cross-sectional shape as the cross-section of the plug 16 and receives the plug 16 in mating relation. In this respect, the plug 16 is precision-machined to a predetermined size and shape.

Prior to insertion of the plug 16 into the pocket 15, nickel braze is applied to the pocket as well as to the surfaces of the plug, for example, the nickel braze material is a Sulzer Hickham braze mixture known as N-38, provided by Sulzer Metco and mixed by SHI. N-38 is a "Narrow Gap Braze" and is specifically designed to join two materials with a narrow gap between them (<0.0005"). This braze mixture is similar to IN-738LC chemistry but includes boron (as do most brazes) to lower the melting temperatures of the joining material and provide the capillary action needed for a proper diffusion of material. Several repair companies have braze mixtures from several different vendors (including Sulzer Metco) for IN-738LC. Any braze material compatible with IN-738LC should be suitable for the restoration process.

Figure 4:
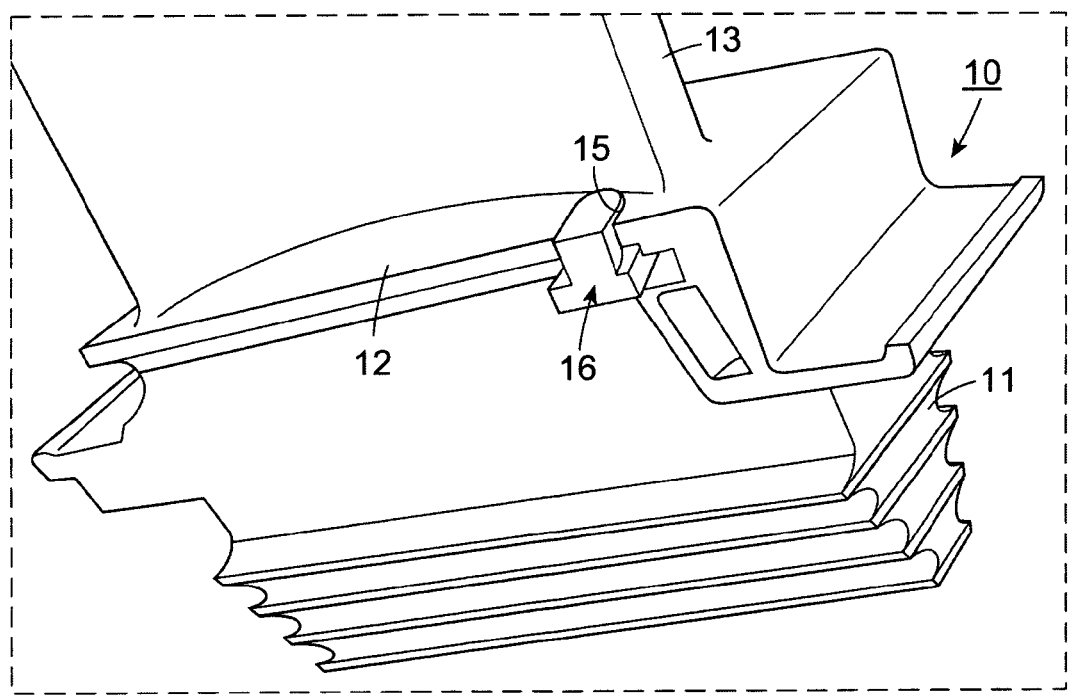
FIG. 4 illustrates a view of the turbine blade of FIG. 1 with the plug inserted into the pocket.

As illustrated in FIG. 4, the plug 16 is of greater length than the pocket 15 so as to project therefrom and to provide stock to blend to the blade contour. The plug is made long to limit the EDM process to machine out the depth of the crack only. The cracks range from 0.250" to 0.800" or more in depth.

Figure 5:
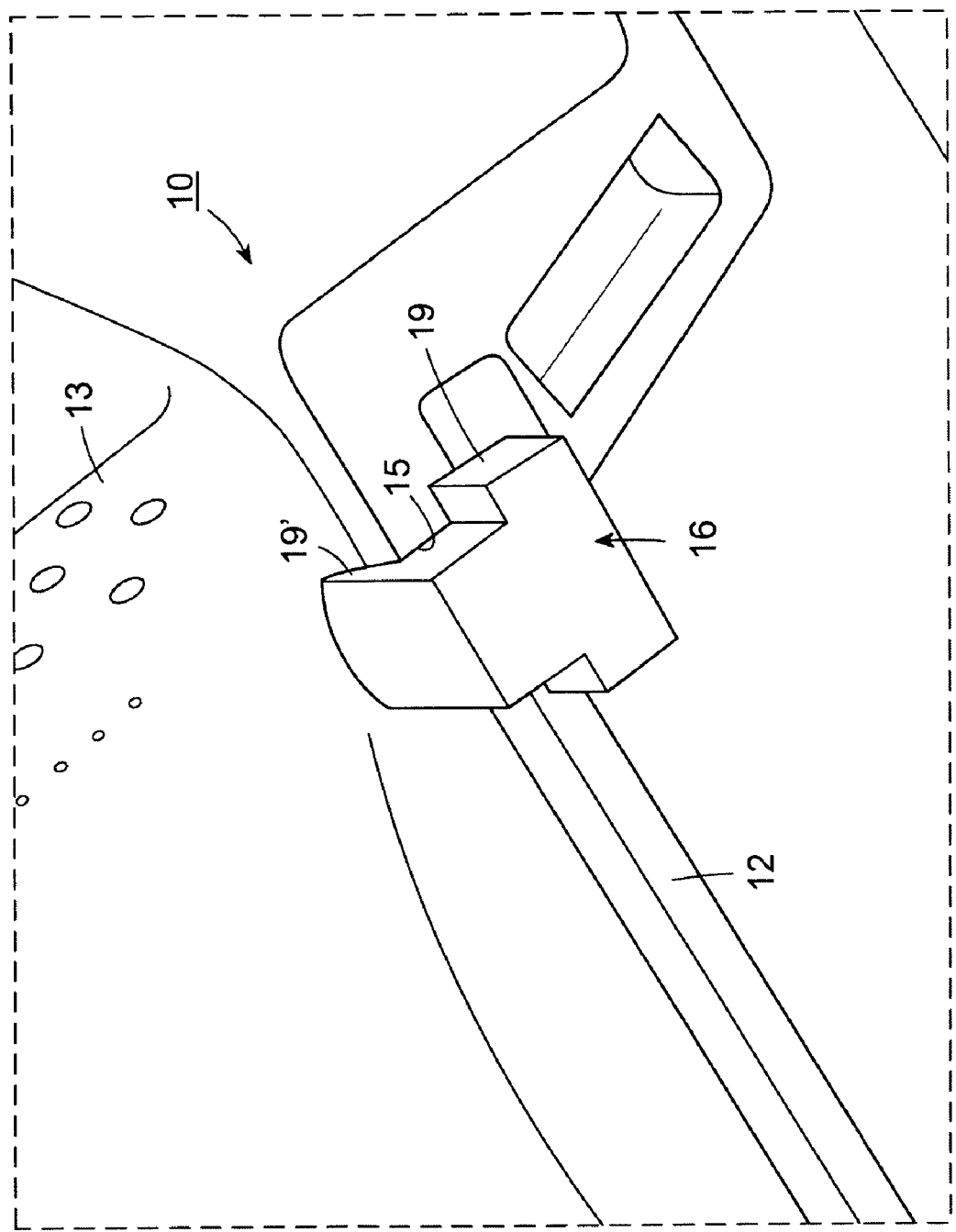
FIG. 5 illustrates a view of the plug as brazed into the pocket in accordance with the invention.

Referring to FIG. 5, after insertion of the plug 16 into the pocket 15, if not previously applied, the plug 16 is brazed into the pocket 15 with a suitable braze material. The braze material, as described above, is injected into the gap between the plug 16 and pocket 15 via a syringe and brushed on the surface to fill any remaining voids. Prior to application of the braze material, the plug 16 and the blade 10 are cleaned via thermal degrease, in a 650 F. degree furnace to burn out and liquid or carbon based contaminations. Then both parts are blasted with a nickel media to remove any remaining contaminations.

After cleaning, the turbine blade 10 and plug 16 are subjected to a vacuum brazing heat treatment in order to braze the plug 16 into the pocket 15. For example, the turbine blade 10 and plug 16 are put into a vacuum furnace per the following cycle:

Ramp rate of 25° F. per minute, dwell at 1900° F. for 30 minutes

Ramp rate of 25° F. per minute, dwell at 2200° F. for 30 minutes

Vacuum cool to 2050° F., dwell for 2 hours, Negative force cool to ambient.

A mixture known as "stop off" can be applied to keep the braze from flowing into unwanted areas. The stop of is made from Aluminum Oxide paste.

Figure 6:
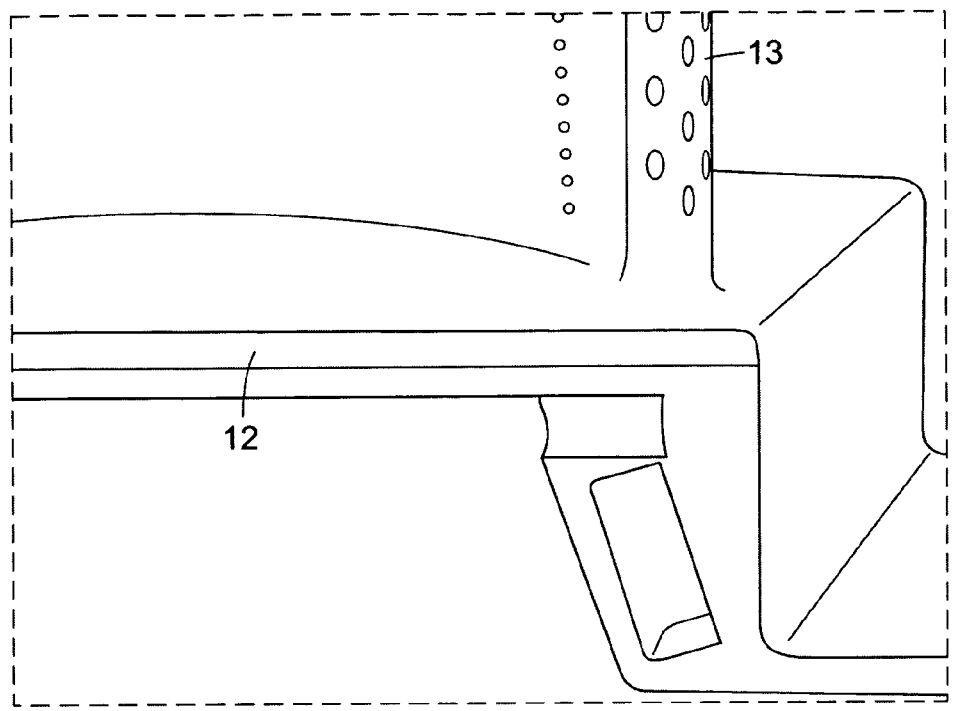
FIG. 6 illustrates a view of the restored area of the blade platform after matching of the plug and braze to the geometry of the blade.

After heat treatment, the plug 16 and braze are worked, for example, by blending or machining, so that the plug 16 and braze match the geometry of the blade 10, as indicated in FIG. 6. In this respect, the portion of the plug 16 that projects from the pocket is removed to provide a smooth, flush surface and the appearance of the blade platform appears uniform, as also indicated in FIG. 6.

In order to maintain the plug 16 within the pocket 15 during heat treatment, the plug 16 may be tack-welded in place in the pocket 15. Alternatively, a seal pin (not shown) may be placed under and across the platform in a conventional manner to keep the plug 16 from falling out of the bottom of the pocket 15. The seal pin is a straight solid rod that is about 0.250" in diameter and about 4" long and is usually made from IN-718or X-750 material, both similar chemistries.

After processing, the turbine blade 10 may be cleaned in a conventional manner, for example, the turbine blade may be grit-cleaned.

Figure 7:
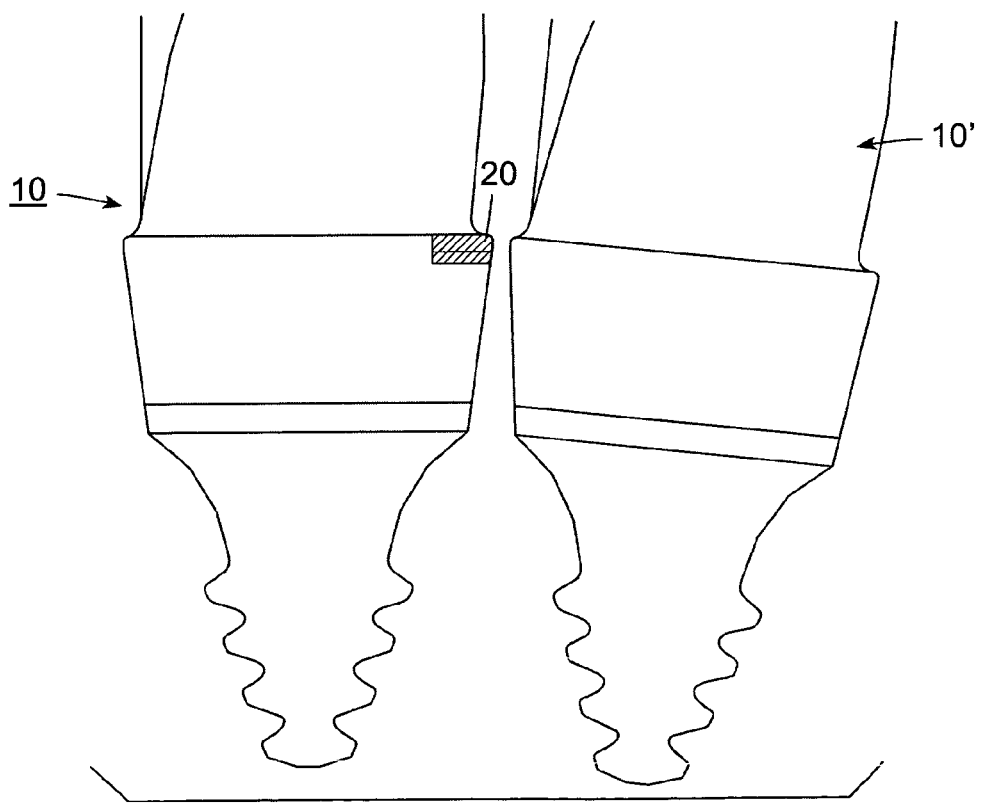
FIG. 7 illustrates a view of a restored turbine blade in a rotor adjacent to another turbine blade.

Referring to FIG. 7, when a restored blade 10 is mounted on the rotor of a turbine engine, the restored area 20 is located adjacent to another blade 10" on the rotor. The distance between the two blades 10,10' is such that the plug 16 cannot escape between the blades.

The plug 16 is constructed so that braze is not required to hold the plug 16 in place. However, braze is desired to fill in any gap between the plug 16 and the pocket 15 and to join the plug 16 to the blade 10.

Braze is also included so that the existing cooling hole (that runs horizontally inside the shank) can be plugged (via plug) and re-drilled to accommodate the existing cooling hole scheme and any new cooling schemes that the OEM has incorporated into a revised casting.

The invention thus provides a process for restoring a turbine blade having a crack in the platform thereof. For example, the process can also be performed on a GE MS7241FA $1^{st}$ stage Turbine Bucket. The GE machines have similar cracks in the same location; most likely has the same failure cause as the Westinghouse blades. This modification can be applied to any of the large industrial gas turbine blades; any machine OEM or any stage of blade.

The invention also provides a relatively simple process for repairing cracks in the platform of a turbine blade and restoring a piece of scrap to a useful turbine blade life.

What is claimed is:

1. A process for restoring a turbine blade having a crack on a side of a platform thereof; said process comprising the steps of
forming a pocket of predetermined length in said platform to obliterate the crack therein;
inserting a plug having a length greater than said predetermined length into said pocket to completely fill said pocket while having a portion projecting therefrom;
brazing the plug into said pocket with a braze material; and
thereafter working said plug and said braze material to remove said portion of said plug projecting from said pocket to match the length of said plug to said predetermined length and to match the surfaces of the platform.

2. A process as set forth in claim 1 wherein said pocket and said plug have matching shapes.

3. A process as set forth in claim 2 wherein said plug has a first section with a rectangular portion and a semicircular portion extending therefrom and a second section with a rectangular portion and a semicircular portion extending therefrom, said second section being of smaller size than said first section and overlying said first section.

4. A process as set forth in claim 1 wherein said step of forming a pocket includes machining of said platform to remove material therefrom to form said pocket.

5. A process as set forth in claim 1 wherein said step of brazing includes an application of nickel braze to said pocket prior to inserting of said plug into said pocket.

6. A process as set forth in claim 1 wherein said plug is made of a material with a coefficient of thermal expansion compatible with said platform to preclude said plug from expanding outside said pocket.

7. A process as set forth in claim 6 wherein said plug is made of a Ni—Cr—W—Mo alloy.

8. A process for restoring a turbine blade having a crack on a side of a platform thereof; said process comprising the steps of forming a rocket in said platform to obliterate the crack therein;
inserting a plug into said rocket to completely fill said pocket;
brazing the plug into said pocket with a braze material;
thereafter working said plug and said braze material to match the surfaces of the platform; and
grit cleaning the blade after said step of blending said plug and said braze material to match the surfaces of the turbine blade.

9. A process for restoring a turbine blade having a crack on a concave side of a platform thereof; said process comprising the steps of machining material from said platform from about said crack to form a pocket of predetermined length in said platform to obliterate the crack therein;
applying a nickel braze to said pocket;
thereafter inserting a plug having a length greater than said predetermined length into said pocket to fill said pocket while having a portion projecting therefrom;
applying a nickel braze to the surfaces of said plug and said turbine blade;
subjecting the turbine blade and plug to a vacuum brazing heat treatment to braze the plug into said pocket; and
thereafter working said plug and said braze material to remove said portion of said plug projecting from said pocket to match the length of said plug to said predetermined length and to match the surfaces of the turbine blade.

10. A process as set forth in claim 9 wherein a vane extends from the platform and said pocket has a cross-sectional shape for retaining said plug therein in a direction of said vane.

11. A process as set forth in claim 9 wherein said plug has a first section with a rectangular portion and a semicircular portion extending therefrom and a second section with a rectangular portion and a semicircular portion extending therefrom, said second section being of smaller size than said first section and overlying said first section.

12. A process as set forth in claim 9 further comprising the step of heating the turbine blade prior to said step of applying a nickel braze to said pocket to a degree sufficient to bake out oils and penetrant therein.

13. A process as set forth in claim 9 further comprising the step of tack welding said plug in said pocket prior to said step of vacuum brazing heat treatment.

14. A process as set forth in claim 9 further comprising the step of inserting a pin between said plug and said pocket.

15. A process as set forth in claim 9 further comprising the step of grit cleaning the blade after said step of working said plug and said braze material to match the surfaces of the turbine blade.

16. A process as set forth in claim 9 further comprising the step of subjecting the turbine blade to an X-ray and Zyglo inspection to ensure blade penetration.

17. A process as set forth in claim 9 wherein said plug is made of one of a nickel alloy and a nickel cobalt alloy.

18. A plug for repairing a turbine blade, said plug having a first section with a rectangular portion and a semicircular portion extending therefrom and a second section with a rectangular portion and a semicircular portion extending therefrom, said second section being of smaller size than said first section and overlying said first section to define a T-shaped cross-section.

19. A plug as set forth in claim 18 made of Ni—Cr—W—Mo alloy.

* * * * *

UNITED STATES PATENT AND TRADEMARK OFFICE
CERTIFICATE OF CORRECTION

| | |
|---|---|
| PATENT NO. | : 7,648,341 B2 |
| APPLICATION NO. | : 11/318237 |
| DATED | : January 19, 2010 |
| INVENTOR(S) | : Matthew Charles Lau |

Page 1 of 1

It is certified that error appears in the above-identified patent and that said Letters Patent is hereby corrected as shown below:

Column 3
Line 56 change "and" to -- any --;

Column 5
Line 19 change "rocket" to -- pocket --;
Line 21 change "rocket" to -- pocket --.

Signed and Sealed this

Sixteenth Day of March, 2010

David J. Kappos
*Director of the United States Patent and Trademark Office*